United States Patent
Zwart et al.

(10) Patent No.: US 9,181,504 B2
(45) Date of Patent: Nov. 10, 2015

(54) METHOD AND DEVICE FOR REMOVING TARS FROM SYNTHESIS GAS OBTAINED DURING GASIFICATION OF BIOMASS

(75) Inventors: Robin Zwart, Alkmaar (NL); Alexander Bos, Groet (NL); Johannes Kuipers, Heerhugowaard (NL)

(73) Assignee: Stichting Energieonderzoek Centrum Nederland, Petten (NL)

(*) Notice: Subject to any disclaimer, the term of this patent is extended or adjusted under 35 U.S.C. 154(b) by 756 days.

(21) Appl. No.: 13/498,048

(22) PCT Filed: Sep. 24, 2010

(86) PCT No.: PCT/NL2010/050622
§ 371 (c)(1),
(2), (4) Date: May 14, 2012

(87) PCT Pub. No.: WO2011/037463
PCT Pub. Date: Mar. 31, 2011

(65) Prior Publication Data
US 2012/0216460 A1    Aug. 30, 2012

(30) Foreign Application Priority Data
Sep. 25, 2009 (NL) .................................... 2003547

(51) Int. Cl.
C10K 1/18 (2006.01)
C10J 3/84 (2006.01)
C10K 1/04 (2006.01)
C10J 3/46 (2006.01)
C10K 1/02 (2006.01)

(52) U.S. Cl.
CPC . C10K 1/18 (2013.01); C10J 3/466 (2013.01); C10J 3/84 (2013.01); C10K 1/046 (2013.01); C10J 2300/0916 (2013.01); C10K 1/024 (2013.01); C10K 1/028 (2013.01)

(58) Field of Classification Search
CPC .............. C10K 1/18; C10K 1/046; C10J 3/84
See application file for complete search history.

(56) References Cited

U.S. PATENT DOCUMENTS 4,123,502 A * 10/1978 Holter et al. ................... 423/230
4,211,539 A *  7/1980 Bierbach et al. ............. 48/197 R
(Continued)

FOREIGN PATENT DOCUMENTS

| GB | 0 158 915 | 2/1921 |
| GB | 0 568 593 | 4/1945 |
| WO | WO-03/018723 A1 | 3/2003 |

(Continued)

OTHER PUBLICATIONS

Search Report in International Application No. PCT/NL2010/050622 mailed Dec. 6, 2010.

*Primary Examiner* — Imran Akram
(74) *Attorney, Agent, or Firm* — Gilberto M. Villacorta; Sunit Talapatra; Foley & Lardner LLP

(57) ABSTRACT

Method and system for gasifying biomass. Tar loaded gas from the reactor for gasifying the biomass is subjected to a saturation and absorption treatment with a first and second fluid respectively. The first fluid comprises aromatic hydrocarbons whilst the second fluid comprises linear hydrocarbons. Tars received in the aromatic fluid is entered together with such fluid in a separation column. Separation is effected based on evaporation temperature and the lighter fraction is returned to the inflow of the saturation separator. The heavier fractions are either discharged or sent back to the biomass reactor. An intermediate buffer vessel can be provided between the discharge of the saturation cleaner and the separator.

9 Claims, 1 Drawing Sheet

(56) References Cited

U.S. PATENT DOCUMENTS

| | | | |
|---|---|---|---|
| 4,211,540 A * | 7/1980 | Netzer | 48/202 |
| 4,375,402 A * | 3/1983 | Durai-Swamy | 208/411 |
| 4,693,729 A * | 9/1987 | Beckmann et al. | 48/203 |
| 2004/0220285 A1 * | 11/2004 | Boerrigter et al. | 518/726 |

FOREIGN PATENT DOCUMENTS

| | | |
|---|---|---|
| WO | WO-2008/010717 A2 | 1/2008 |

* cited by examiner

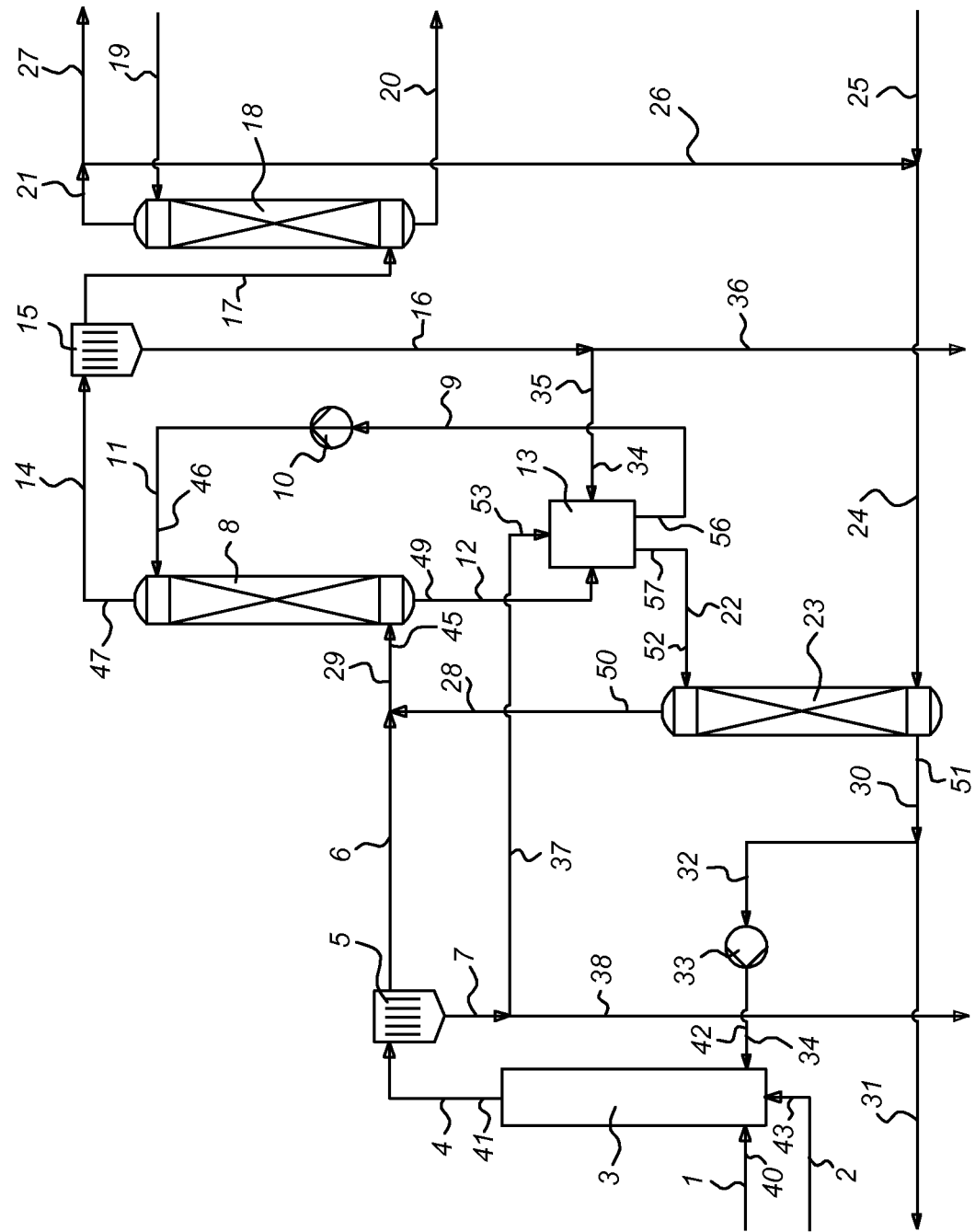

METHOD AND DEVICE FOR REMOVING TARS FROM SYNTHESIS GAS OBTAINED DURING GASIFICATION OF BIOMASS

The present invention relates to a method for gasifying biomass in a reactor according to the preamble of claim 1.

Such a method is known from WO 2008/010717 A2 of patent proprietor and discloses a method and system wherein gas leaving a biomass reactor is subjected to an oil flow. Excess oil is recirculated and after filtering dust therefrom is again used for contact with the gas from the reactor. Additional oil is received from a downstream separation device into which the gas is entered.

In WO 03/018723 of patent proprietor a so-called OLGA system is disclosed which is specifically designed for gasifying biomass. The gas which results from gasifying is subjected to a two step cleaning treatment to remove tars. In a first step the gas is condensed in a first cleaning fluid which is an oil. Saturating can take place for example by showering oil in the gas stream.

In a second stage oil is used for absorption of the remaining tars in an absorption column.

After use the oil laden with tars is discharged to a separator wherein the heavy fractions are returned to the biomass gasifier and the lighter fractions are further used as oil for the above process.

Although theoretically a well functioning system, in practice it revealed that at after a start up period in which cleaning was very effective, subsequently least in the first cleaning step a substantial part of the gas is not cooled and tars are not condensed and have to be removed in the second absorption step. However the absorber used to this end should have relatively small dimensions and therefore cannot be operated at higher temperatures. This means that the efficiency of the first cleaning step is not as could be expected. Furthermore the oil quality changes in time causing problems in handling within the system, requiring some form of oil recovery. More particular the distribution between lighter and more heavy components changes in the direction of the more heavy components making the viscosity significantly higher and tar removal less efficient.

The invention aims to overcome this objection and to provide a first cleaning step wherein a more substantial part of the tars present in the gas and being specific for biomass gasification can be removed.

According to the invention this aim is realised with a method having the features of claim 1.

Surprisingly is has been found that if aromatic hydrocarbons are used the efficiency of cleaning in the first cleaning step can considerably be increased.

Furthermore these aromatic hydrocarbons are subjected to a separating step after use thereof.

In the original OLGA concept as cleaning oil an aliphatic hydrocarbon was used having a linear molecule chain, or alkene.

It appears and can be explained that the solving properties of aromatic tar components in an aromatic solvent are much better than in an aliphatic solvent.

According to a preferred embodiment of the invention the aromatic hydrocarbons are carbons corresponding to the aromatic hydrocarbons of the tars. More particular such hydrocarbons comprise both heavy and light tars. A relatively light tar is defined as a tar comprising up to three to four rings PAH.

According to the invention a first mixture comprising the first cleaning fluid and the tar received therein are subjected to a first separation step. In such separation step separation is effected based on the evaporation temperature of the related component in the first mixture. According to the invention the lighter fraction resulting from such separation is added to the gas flow from the gasifying reactor and the heavier fraction is discharged. Part of this discharged heavy fraction can be returned to the inlet of the biomass reactor, or, as this fraction contains much chemical energy, can be used for other heating purposes.

As example the lighter fraction contains one or more of ethylbenzene, m/p-xylene, o-xylene+styrene, phenol, o-cresol, indene, m/p-cresol, naphtalene, quinoline, iso-quinoline, 2-methyl-naphtalene, 1-methyl-naphtalene, biphenyl, ethenyl-naphtalene, acenaphthylene, acenaphthene, fluorene, phenanthrene, anthracene, fluoranthene, pyrene and the heavier fraction contains for example one or more of benzo(a)-anthracene, chrysene, benzo(b)-fluoranthene, benzo(k)-fluoranthene, benzo(e)-pyrene, benzo(a)-pyrene, perylene, indeno(123-cd)-perylene, dibenzo(ah)-anthracene, benzo(ghi)-perylene, coronene.

According to a further preferred embodiment the first mixture is not directly subjected to the first separation step but stored in an intermediate buffer. From this intermediate buffer part of the first mixture is entered in the first separator described above. A further part is subjected to the first cleaning step. This means that the first mixture from the first cleaning step is only partially subjected to the first separation step. Furthermore to such intermediate buffer substances can be added having effect on the viscosity of the mixture therein. More particular dust (char and ash) like substances can be added for increasing the viscosity. As example dust separated from the gas from the biomass reactor is mentioned. Such dust can be separated from the gas in a step before the first cleaning step or after the first cleaning step. If separation is effected before the first cleaning step preferably cleaning based on gravity such as in een cyclone is effected. If separation is effected after the first cleaning step preferably separation is effected through an electrostatic filter.

After the first cleaning step a second cleaning step is provided being based on absorption.

It will be noticed that in this process substances can be added to maintain the required cleaning properties of the first fluid. Furthermore steps should be taken to increase, maintain or decrease the relevant temperature at the related position.

Downstream from the first cleaning step a second cleaning step is provided which could be effected by absorption through the use of an oil having a more linear molecule chain structure (aliphatic oil). Relative minor quantities of tars could very effectively be removed in such downstream absorption system. However it is a prerequisite that in the first separation step most of the tars are already removed.

The invention also relates to a system gasifying biomass, comprising a biomass gasifier having an inlet for biomass to be gasified and an outlet for resulting gas, said outlet being connected with a first cleaning device, said first cleaning device comprising an inlet connected with said outlet as well as an inlet for a first cleaning fluid, an outlet for cleaned gas and an outlet for product resulting from cleaning, wherein said first cleaning device comprises a saturation device and said outlet is connected with a first separator device for recovery of said first fluid from said outlet, wherein said first separator device comprises a stripper column of which the outlet for light aromatic fractions is connected with inlet for a first cleaning fluid of said first cleaning device and the outlet for heavy aromatic fraction is connected with a discharge.

More particular a buffer vessel is provided connected between the first cleaning device and the first separator device wherein such buffer vessel is connected with the inlet for first cleaning fluid of said first cleaning device. The invention will be further elucidated referring to an example thereof which is schematically shown in the single figure.

In the figure a system according to the invention is schematically shown. A biomass gasifier 3 is provided to which a flow of biomass 1 is added through its inlet 40. A gasifying gas such as air, oxygen and/or steam is schematically indicated by 2 and entered at inlet 43. Except from biomass 1 also a flow of relatively heavy tars at 34 can be entered through either inlet 40 or a separate inlet 42, depending on the type of gasifier (e.g. single or duel reactor gasifier).

In the biomass gasifier gasification takes place at a temperature of 600-1300° C. Sub-stoichiometric quantities of oxygen are supplied.

The gasses leaving the outlet 41 of the gasifier contain except from the desired components ($CO$, $H_2$, $H_2O$, $CH_4$) also (carbon) dust and tars (heavier hydrocarbons).

In a first step separation based on gravitation and more particular with a cyclone 5 for removing dust the production of gas 6 is realised. The flow of dust resulting from the cyclone is indicated by 7 and is partially fed to inlet 53 of a buffer vessel 13, as shown with arrow 37, whilst a further part thereof can be discharged through other means as is indicated by 38.

The (partly dust) cleaned gas flow 6 is mixed with the lighter fraction from the product 22. The mixture resulting is indicated by 29 and is entered in a saturation device 8. Through inlet 46 of the saturation device a first cleaning fluid 11 is sprayed in downward direction on the gas flow which moves in upward direction to outlet 47. Most of the tars contained in the gas flow are caught in this way and together with the first fluid discharged through outlet 49 and entered in buffer vessel 13 as indicated by arrow 12. Except from an inlet for the discharge of first cleaning device 8 buffer vessel 13 comprises the inlet 53 as described above for dust particles from the cyclone 5. Also an inlet 34 is provided to which further dust from a downstream filter 15 can be entered as is indicated by arrow 35. The buffer vessel 13 has two outlets one outlet 56 for first cleaning fluid 11 which is supplied to a pump 10 as shown by arrow 9 and subsequently entered in the first separator device 8. A second outlet 57 provides the connection through arrow 22 to a separator column 23. In this column 23 a gas 24 is entered in the lower part thereof. This gas is preferably from an outside source and can comprise steam, carbon dioxide and/or nitrogen. It is also possible that this gas is part of the final product gas and this gas is indicated by 26 in the figure. Such relatively clean gas 24 is entered in the lower part of the column 23 and could be pre-heated. Because of the flow of such gas, separation based on evaporation temperature is effected. The lighter fraction from the product 22 entering the inlet 52 of column 23 is separated through outlet 50, this flow 28 is mixed with the gas flow 5 resulting in flow 29.

For example the evaporation temperature in the first separator device 8 is 280-320° C. However this depends on the light fraction which is acceptable in the gas flow 6.

The heavier portion of the mixture, comprising the tars and dust, and the first cleaning fluid will not evaporate and is discharged through outlet 51. This flow 30 can partially be returned to the lower side of the biomass gasifier as is indicated by arrow 32, pump 33 and arrow 34. However it is also possible to discharge this heavy fraction in another way as indicated by arrow 31. Of course it is possible that depending on the circumstances one of these discharges is (more) preferred.

Except from tars containing only hydrocarbons and dust also sulphur and chloride containing compositions can be removed from the gas flow.

Through the addition of solid components such as dust as indicated by arrows 35 and 37 the viscosity of the mixture in vessel 13 as well as product 30 will change. This can be desirable and the ratio of the dust from cyclone 5 being entered in vessel 13 and being discharged as indicated by arrow 38 as well as the ratio of quantities being discharged according to arrows 35 and 36 determine the increase in viscosity of the mixture leaving the vessel 13.

As indicated above downstream from the first separator device 8 a filter 15 is provided. Preferably this filter 15 is an electrostatic precipitator removing dust. After the two dust removal steps at 5 and 15 the gas is substantially free of dust and this gas flow 17 is entered into the lower part of an absorber 18. A flow of (alkane based) oil (aliphatic) is entered in the top of this absorber indicated by 19. The tars together with the oil are discharged through 20 whilst the clean gas not containing tars is indicated by 21. A part of it can be recycled through 26 and the gas indicated with 27 is the final product gas.

EXAMPLE

In an example the gas stream 6 has a temperature above the tar dewpoint of the gas, typically 200 to 400 degrees Celsius at atmospheric conditions, slightly higher at elevated pressures. The gas is partially condensed in column 8 by oil with a temperature preferably slightly above the water dewpoint of the gas stream 6, typically 50 to 90 degrees Celsius. The mixture in vessel 13 as such will have a temperature in between the initial oil temperature and the initial gas stream temperature, hence between 150 and 250 degrees Celsius. This temperature is increased typically with 50 to 100 degrees Celsius in order to provide the separation of stream 50 and 51. The yields at the different stages will strongly depend on the composition of the gas stream 6, hence the gasifier applied and the operating conditions of the gasifier chosen. For gasifiers without primary tar measures like catalytic bed materials implemented the split off between light and heavy tars in column 8 will be between 20 and 80%. The split off in column 23 will strongly depend on the desired viscosity of the mixture in vessel 13 and of the product 51, though typically 30 tot 70% will be separated from the top.

After the above it will be immediately clear for the person skilled in the art that numerous changes can be brought about to the system as described above depending on the purpose of use. More particular depending from the contents of the biomass added to the gasifier 3, the desired output of the system and the allowable discharge adaptions can be made to the several process flows and further devices can be added or omitted.

Such amendments are within the range of a person skilled in the art and within the scope of the appended claims.

The invention claimed is:

1. A method for removing tars from gas produced by gasifying biomass at a temperature of 600-1300° C., the method comprising:
   (a) saturating the gas comprising tars at a temperature of 250-900° C. with a first hydrocarbon-based fluid comprising aromatic hydrocarbons to provide an aromatic tar mixture and a low-tar gas,
   (b) entering the aromatic tar mixture into a buffer to provide a buffered aromatic tar mixture;
   (c) separating a part of the buffered aromatic tar mixture via evaporation into a light fraction and a heavy fraction,
   (d) adding the light fraction to the gas comprising tars in step (a); and (e) subjecting the low-tar gas to a second hydrocarbon-based fluid, thereby absorbing remaining tars, wherein the first hydrocarbon-based fluid is different from the second hydrocarbon-based fluid, wherein another part of the buffered mixture of step (b) is reused for saturation step (a).

2. The method according to claim 1, wherein the first fluid comprises aromatic hydrocarbons corresponding with the tars to be removed.

3. The method according to claim 1, wherein the light fraction comprises one or more of ethylbenzene, m-xylene, p-xylene, o-xylene, styrene, phenol, o-cresol, indene, m-cresol, p-cresol, naphthalene, quinoline, isoquinoline, 2-methyl-naphthalene, 1-methyl-naphthalene, biphenyl, ethenyl-naphthalene, acenaphthylene, acenaphthene, fluorene, phenanthrene, anthracene, fluoranthene, and pyrene, and wherein the heavy fraction comprises one or more of benzo[a]anthracene, chrysene, benzo[b]fluoranthene, benzo[k]fluoranthene, benzo[e]pyrene, benzo[a]pyrene, perylene, indeno[1,2,3-cd]perylene, dibenzo[a,h]anthracene, benzo[ghi]perylene, and coronene.

4. The method according to claim 1, wherein the gas is cleaned in a cyclone before the saturation step (a).

5. The method according to claim 4, wherein a non-gaseous fraction resulting from the cyclone is supplied to the buffer.

6. The method according to claim 5, further comprising adjusting the viscosity of the buffered aromatic tar mixture by adjusting the supply of non-gaseous fraction.

7. The method according to claim 1, wherein the low tar gas is cleaned by an electrostatic filter after step (a) and before step (d).

8. The method according to claim 6, wherein a non-gaseous fraction resulting from the electrostatic filter is supplied to the buffer.

9. The method according to claim 1, wherein the second hydrocarbon-based fluid comprises linear hydrocarbons.

* * * * *